United States Patent [19]

Khurana

[11] Patent Number: 4,811,090
[45] Date of Patent: Mar. 7, 1989

[54] IMAGE EMISSION MICROSCOPE WITH IMPROVED IMAGE PROCESSING CAPABILITY

[75] Inventor: Neeraj Khurana, Los Gatos, Calif.
[73] Assignee: Hypervision, Los Gatos, Calif.
[21] Appl. No.: 140,494
[22] Filed: Jan. 4, 1988
[51] Int. Cl.[4] .............................................. H04N 7/18
[52] U.S. Cl. ...................... 358/93; 358/101; 358/166; 358/211; 382/18
[58] Field of Search ................ 358/93, 101, 107, 166, 358/211; 250/310, 311; 382/8, 18

[56] References Cited

U.S. PATENT DOCUMENTS

| | | | |
|---|---|---|---|
| 4,394,744 | 7/1983 | Wrench, Jr. | 358/166 X |
| 4,441,205 | 4/1984 | Berkin et al. | 382/18 X |
| 4,592,089 | 5/1986 | Hartman | 358/93 X |
| 4,667,231 | 5/1987 | Pryor | 358/101 X |
| 4,680,635 | 7/1987 | Khurana | 358/211 |

Primary Examiner—James J. Groody
Assistant Examiner—Victor R. Kostak
Attorney, Agent, or Firm—Flehr, Hohbach, Test, Albritton & Herbert

[57] ABSTRACT

An emission microscope includes integrating and enhancing devices operating in parallel for optimizing the image of a scanned semiconductor device. Integration is terminated when sufficient clarity is acquired. The system further incorporates adaptive histogram matching using a noise distribution curve. Those pixels not meeting a predetermined intensity level are deleted to further enhance image display.

12 Claims, 5 Drawing Sheets

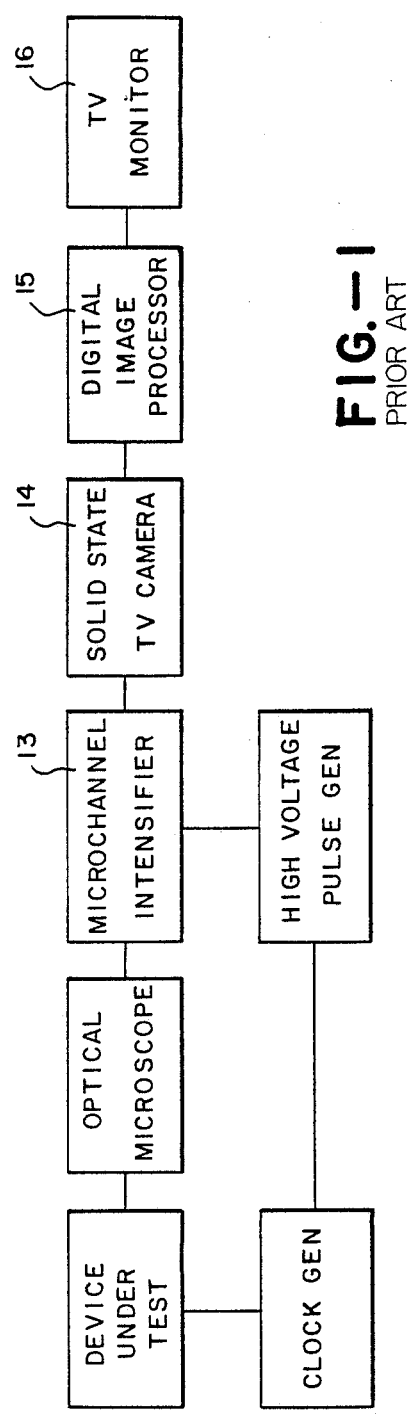
FIG.—1
PRIOR ART
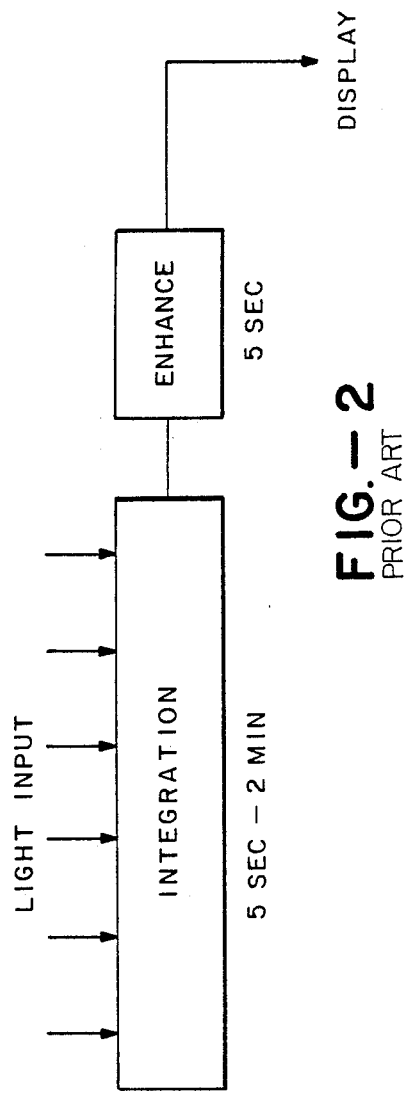
FIG.—2
PRIOR ART

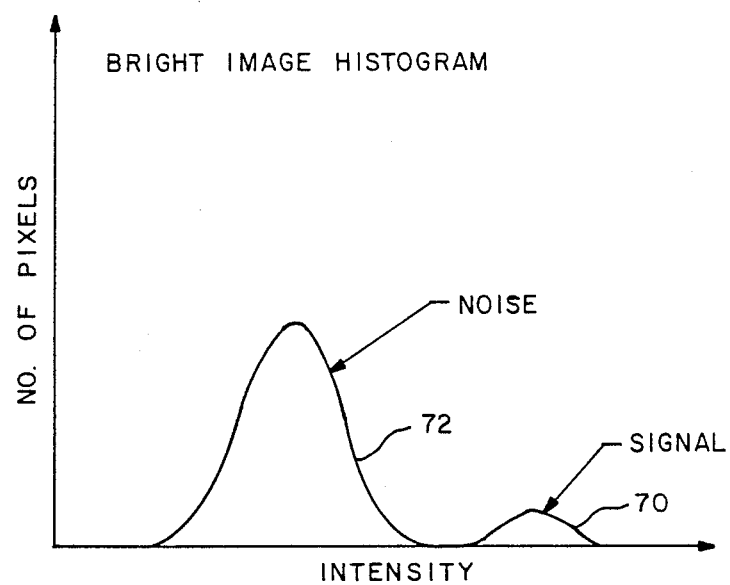
FIG.—5A
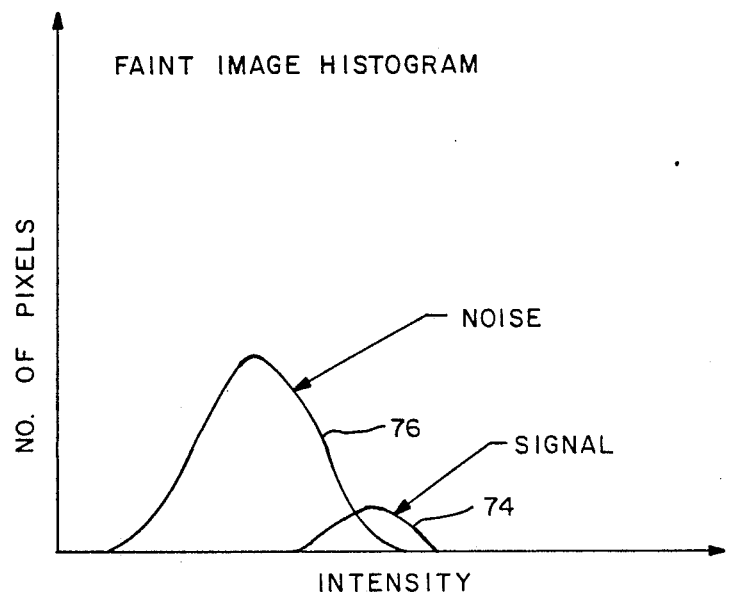
FIG.—5B

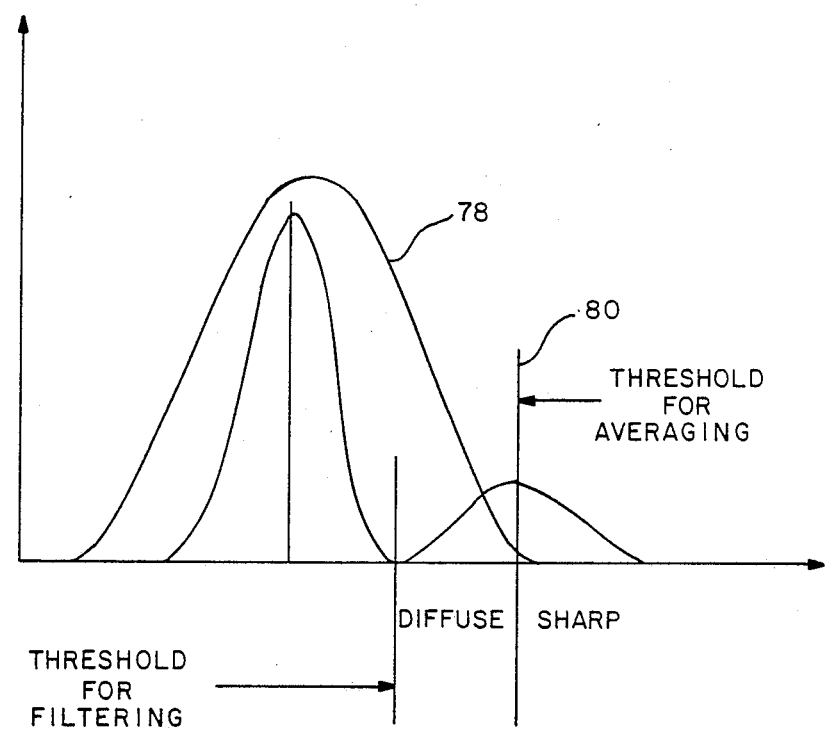
FIG.—6
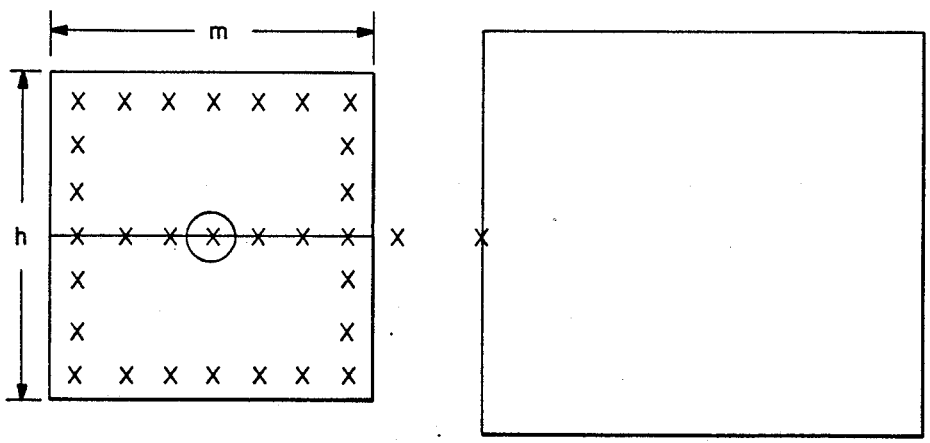
FIG.—7A   FIG.—7B

IMAGE EMISSION MICROSCOPE WITH IMPROVED IMAGE PROCESSING CAPABILITY

FIELD OF THE INVENTION

This invention relates generally to the field of testing semiconductor circuits.

BACKGROUND OF THE INVENTION

It is well known that, under excitation, a semiconductor device will emit a very small amount of light. However, the light emission process in silicon is notable for its poor quantum efficiency. Less than 0.01% of whole electron pairs recombine by emitting a photon. Therefore, it would require hundreds of milliamperes of current through a silicon device in avalanche breakdown to view the light emission with the human eye. As shown in the block diagram of FIG. 1, it is also well known to focus the light emitted using an optical microscope on a microchannel intensifier. The objective of taking these focusing and intensifying steps is to develop an image of the location of hot electron emission and other impact itemization from a semiconductor device over a period of time. In this way, transistors subject to hot electron effects may be identified.

Such hot electron effects have been recognized as a problem in small scale semiconductor devices for a long time. Progressive scaling of the feature sizes of integrated circuit technology has made new products much more susceptible to such hot electron effects. As explained in the article, "Analysis of Product Hot Electron Problems by Gated Emission Spectroscopy" by N. Khurana and C. L. Chiang (CITATION), the need exists for an analytical instrument allowing the examination of a product for rapid determination of the transistors most vulnerable to hot electron effects. The article and a related patent U.S. Pat. No. 4,680,635 disclose a system of the type shown in FIG. 1 of the present application. That system uses a microchannel intensifier 10 which projects the image of the semiconductor device on the photocathode of an image tube creating photoelectrons in proportion to the intensity of the optical image. These photoelectrons are accelerated and focused by the electron optics onto a phosphorous screen. Each photoelectron generates several hundred photons striking the phosphor, thus providing a much brighter output image which can in turn be conveyed to a solid state camera 14 to generate the desired television signal to be used to drive an image processor 15 which in turn displays its output on a television monitor 6. In this way, the light which, as emitted, is much fainter than the human eye can see, can be amplified. The objective is to render it visible on a television monitor display, and have the light sufficiently focused so the particular point on the semiconductor device emitting the light (and therefore presumably subject to hot electron effects) can be identified. Thus, the light emitted indicates stress points and defects on silicon chips that are too small to detect with the naked eye or with optical microscopes alone.

The problem arises that typically, defects sought to be detected emit a very limited number of photons, perhaps only one photon every three seconds. Therefore, if a typical processing cycle is one second, the result will be flicker or noise. Thus, while the prior art amplifies the light, it makes it brighter but does not solve the noise problem.

The classic solution this problem as shown in FIG. 2 has been integration over time, taking the light inputs over a period of, perhaps, 30 seconds, whereby the average number of photons over each time period can be made more consistent. Such integration, which uses a standard integrator 20 to feed the enhancement device 22 suffers from a deficiency in requiring a considerable amount of time to process the image, i.e., five seconds to two minutes of image integration followed by typically five seconds of enhancing.

Another disadvantage of this approach is that the duration of integration required to raise the information signals to useful strength depends on the intensity of the signal output from the defective chip region, which is not known a priori. The proper integration time can be guessed only after viewing the processed image. If a user underestimates integration time, the process will have to be repeated. Typically, the integration time is overestimated, which is wasteful of the tester's time.

Even given this integration, however, it is then necessary to do processing to reduce the noise level, specifically background subtraction. This processing step s necessary because of the fact that some thermal emission occurs even in the absence of light emission, which will be detected by this extremely sensitive system. With integration over time, this background can be significant and would represent errors in the absence of some noise processing. The difficulty presented in subtraction of the background noise is that the level of background noise will fluctuate, i.e., it is not a constant. Therefore, subtraction of background noise is not so simple as setting a fixed threshold level below which the information is eliminated from consideration. I is this fluctuation in the background noise, therefore, that limits the sensitivity of systems disclosed in the prior art.

Another difficulty with known systems is that all the elements of the system must be incorporated within a "black box," with absolutely no local sources of illumination which can interfere with the light being detected from the emitting source. This makes wafer handling both difficult and slow.

A further difficulty with the mechanics of known prior art systems is that in reflecting the light to follow the necessary optical path from the wafer under test to the eye piece, mirrors are used, which typically only reflect 50% of the light, thereby losing up to one-half of the light emitted from the device under test.

SUMMARY OF THE INVENTION

It is an objective of this invention to provide an improved emission microscope, and more particularly, to provide an emission microscope having an enhanced ability to detect process faults, hot electron effects and other defects in semiconductor devices.

A further objective of this invention is to provide an emission microscope structure wherein the elements that the user must make frequent use of, especially the eye piece, are positioned outside the black box which holds the device under test.

A further objective is to provide improved high speed processing of the light emissions from the device under test.

A more particular object herein is to provide an improved scheme of pipeline processing of the light emissions captured and processed by the image processor.

A further objective is to provide an improved approach to noise reduction in an emission microscope.

More particularly, an objective is to provide an improved approach to the processing of the noise content of the signal relative to the information content, whereby the noise which otherwise significantly interferes with the clarity of the image on the display can be significantly reduced or eliminated.

These and other objectives are provided by using improved pipeline scheme of image processing whereby the host computer and the image processor operate in parallel on the light input from the microchannel intensifier which, in turn, is responsive to the photon emissions from the device under test. Under this scheme, the image processor integrates the incoming image, while the host processes and displays the integrated image on a relatively frequent basis. The integration can be terminated whenever the test process controller sees an adequate signal-to-noise ratio.

Under this scheme, the host computer has two modes of operation, i.e., image processing and enhancement mode, and supervising the image processor card. The host computer is interrupted every 1/60 of a second (corresponding to the television frame rate), putting it in a supervisory mode. It then issues the commands necessary to properly condition the image processor for the next television image. The host then returns to the image processing mode.

When the host computer finishes processing an image, it passes it on to a display system. It then awaits an opportune moment to transfer the image integrated by the image processor card to its own internal buffer. During this transfer, the integration by the image processor card is suspended.

In a preferred embodiment, the image processor card has a 16-bit accumulator or buffer, i.e., using 16 bits to represent each integrated pixel intensity. It can accumulate 268 8-bit images without overflow. The buffer in the host uses 32 bits for each pixel intensity, so that it can be used to accumulate 16,000,000 8-bit images. Therefore, for the first 256 images, the image in the image processor is transferred to the host for processing, clearing the prior image in the host. Past this limit, the image from the processor card is added to the earlier image in the host. The image in the processor card memory can now be eliminated.

The further image processing operation performed by the host computer includes subtracting the background, i.e., the signal present in the absence of any light, noise thresholding and filtering, and scaling. Accordingly, the sensitivity is limited only by the noise due to fluctuations in the background.

The present system further uses an improved method of adaptive histogram matching. This adaptive histogram matching is based on the assumption that most of the pixels in an emission image have no signal. Typically, noise limits sensitivity. If the noise magnitude is known, the image can be improved by thresholding; however, the noise magnitude is usually unknown. Alternatively averaging (averaging the pixel intensity over its neighbors) may be used to reduce noise. However, this is an expensive solution and reduces image clarity.

It is known that the histogram of the noise present in an emission microscope image almost follows as Gaussian distribution. Therefore, the method of this invention is based on an approach that assumes that since a large number of pixels in an emission image have no signal, the faintest intensities in the image histogram can safely be presumed to be noise. The histogram of these noisy pixels is fitted to the expected Gaussian distribution. The parameters of the fitted distribution provide an automatic, on-line estimation of the noise magnitude. This allows the optimum noise filtering operations to be applied.

More particularly, the histogram fitting process requires a good first guess of the parameters, refinement of the parameters by an iterative Newton-Raphson technique, as known in the art; a first guess for the mean of the noise distribution which is the most frequent intensity in the faint half of the picture, and fitting of the histogram only to the faint half of distribution. More particularly, a Gaussian distribution is fitted to the faintest 25% of the pixels. This allows a determination of the statistical parameters of the noise. These noise parameters allow further image enhancement by selective low pass filtering, i.e., averaging only those pixels that have an intensity within the expected noise histogram, and thresholding to eliminate this noisy signal.

The features and advantages of this invention will be more readily apparent to a person of skill in the art who studies the following detailed description of a preferred embodiment given in conjunction with the following drawings.

BRIEF DESCRIPTION OF THE DRAWINGS

FIG. 1 is a block diagram of an emission microscope as known in the prior art.

FIG. 2 is a schematic view of a prior art integration-enhancement sequence.

FIG. 5a–5b illustrate the adaptive histogram matching and processing used in this invention.

FIG. 6 illustrates the averaging process used to eliminate noise in the signal processing of this invention.

FIG. 7a–7b illustrate a method of summation of the noisy signal pixels useful in reducing noise in this invention.

DETAILED DESCRIPTION OF A PREFERRED EMBODIMENT

Figure 3:
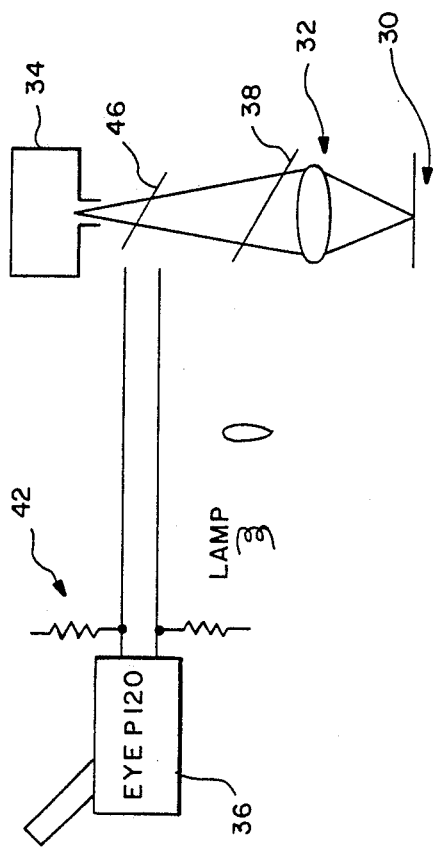
FIG. 3 is a schematic illustration of the essential elements of the emission microscope of this invention.

In this invention, an emission microscope is disclosed along with the signal processing techniques necessary to provide time resolution and high sensitivity of the imaging of the of electro luminescent output of silicon devices. The preferred embodiment of the structure of this invention is generally illustrated in FIG. 3.

Figure 8:
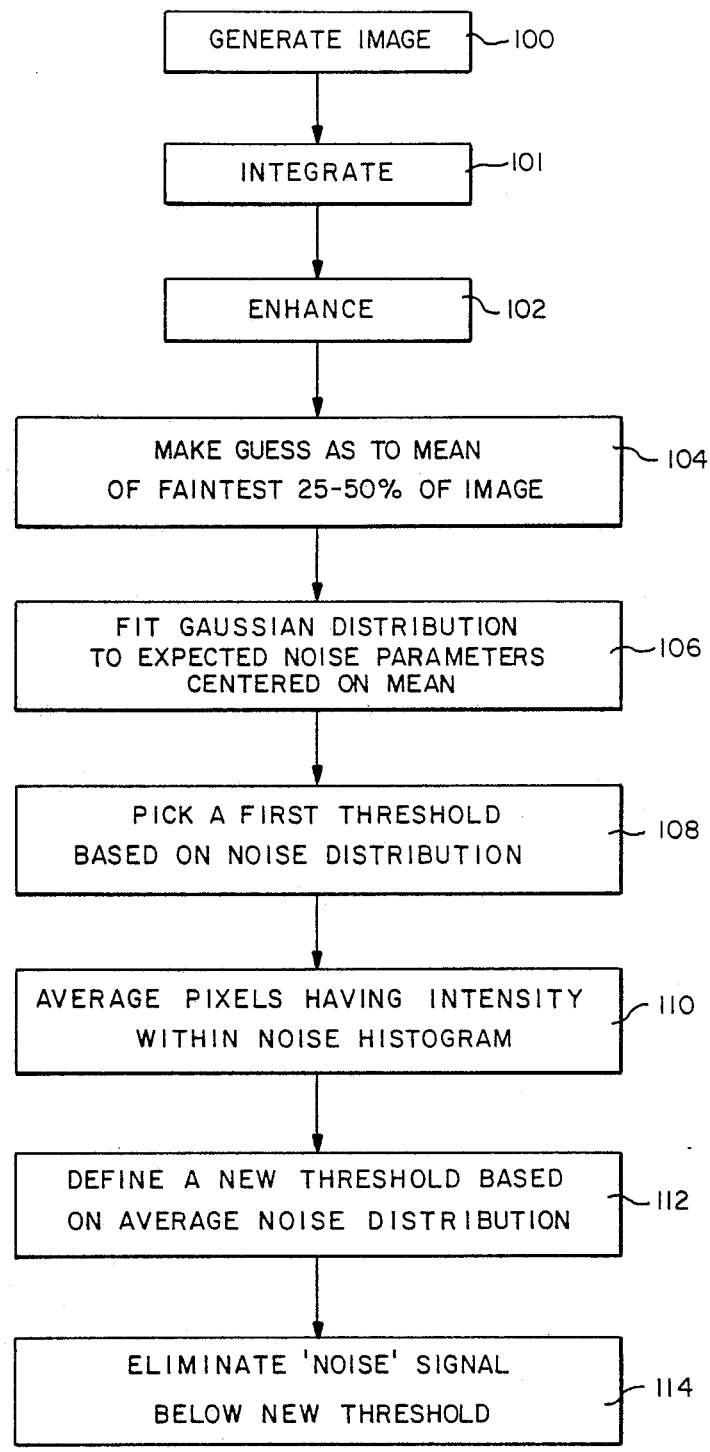
FIG. 8 is a flow chart of a noise reduction sequence.

The steps of the method implemented with this structure are outlined in FIG. 8. As shown in FIG. 3, the integrated circuit 30 to be observed is disposed beneath microscope optics 32. The objective lens system 32 directly projects an image of the silicon wafer 30 on the sensor 34. The objective lens 32 consists of a lens projecting an image at infinity, followed by a decollimating lens. A relay lens scheme, not shown, is provided to allow eye piece viewing of the wafer 30 at the eye piece 36.

It should be noted that, rather than use mirrors that reflect only 50% of the light to convey the light output from the objective lens to the sensor and the eye piece, this invention uses plain glass at the reflective surfaces 38, 40, with an antireflective coating. These glass surfaces convey a much higher percentage of the available light output from the wafer 30 to the sensor 34 and remote eye piece 36, which is outside the "black box" that houses the wafer 30. It should further be noted that by providing the eye piece 36 outside the frame of the black box represented generally at 42 that handling of the wafer is significantly reduced and the number of elements whose light emission must be carefully controlled is minimized. The output of the sensor (step 100, FIG. 8) is conveyed to the microchannel intensifier and solid state television camera 14 to be processed by the image processor 15 as described with reference to FIGS. 4–7 (steps 101–114).

Figure 4:
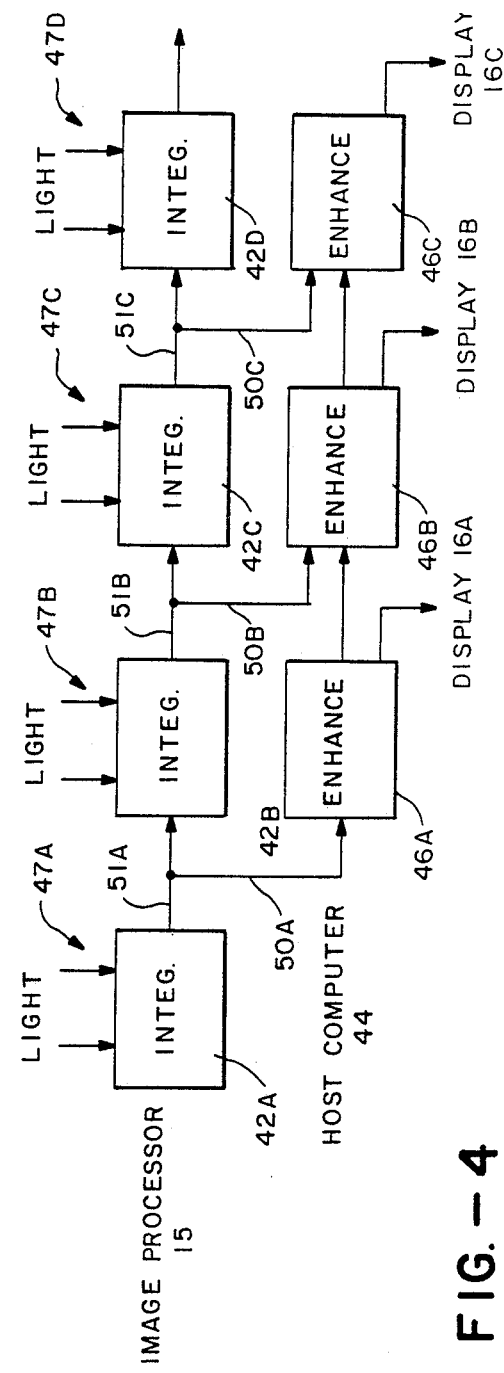
FIG. 4 is a block diagram illustrating the integration and enhancement and display process sequence of this invention.

In the image processor 15 according to this invention, the light output from the sensor 34 is integrated (FIG. 4, step 101 of FIG. 8) for a relatively brief period of about 10 seconds at integrator 42, and then passed to the host computer 44 for enhancement (step 102) in enhancement subsystem 46 in a manner to be described below. The host computer 44 enhances the image and displays it on display 16. It may be that in this point the display 16 is already sufficiently clear and has an adequate signal-to-noise ratio that processing can be terminated. Thus, a user simply monitors the display 16 and at the end of each integration period looks at the renewed display output of the enhancement device. In this way, the host computer 44 that was typically idling during the integration carried out by the dedicated image processor 15 has now been put to continuous work in enhancing the output of the integrator 42 at the end of each time segment which is sufficiently long to have a reasonably probability of providing signal information with an adequate signal-to-noise ratio. The diagram of FIG. 4 is essentially intended to show a flow of information that, at the end of a first integration period as represented by integrator 42A, the enhanced image output from enhancing device 46A is displayed while the integration continues for a second period as represented by integration device 42B. Thus, the integrator itself may not constitute physically separate devices, but rather, is shown in separate blocks to illustrate successive, separate periods of time. At the end of each such period of time, the current state of the integrated signals in integration device 42 are transferred to enhancement in enhancement device 46 for subsequent display on display 16. Thus, the arrow 47A into the integrator 42A represents the light from all pixels for a first period of time of several seconds; the arrows 47B represent the light into the integrator 42B over a second period of time or time frame from all pixels, and so on.

In known systems, it is the classic duty of the host computer 44 to control the image processor 15. In the present embodiment, the host computer, rather than being continually devoted to image processing, interrupts its other function of image enhancement, discussed below, only every 1/60 of a second which is the television frame rate to put itself in this classic supervisory mode. A major portion of the remaining available time is devoted to image enhancement. The structure of this invention also takes advantage of the differing accumulation capabilities of the image processor and the host computer. The image processor card has a 16-bit accumulator, or buffer, i.e., 16 bits to represent each pixel intensity. Processor 15 can therefore accumulate only 256 8-bit images, without overflow. However, the buffer in the host computer 44 uses 32 bits to represent each pixel intensity. Therefore, it can be used to accumulate 16,000,000 8-bit images for each pixel. Therefore, the following approach, illustrated in FIG. 4, is used. For the first 256 images, the image data in the image processor 15 is transferred to the host 44 for processing (clearing the prior image in the host computer 44). Past this limit, the image from the processor integrator 42 is transferred from the processor 15 and added to the earlier image already stored in host 44 to be enhanced in enhancement device 46. Upon occurrence of such transfer, the image in the processor card is cleared out and a new integration time period begins.

Thus, for example, the output of integrator 42A, if it has not stored 256 8-bit images when it is transferred directly on line 50A to enhancement device 46A of host computer 44. This information is transferred forward on line 51A to integrator 42B. The integration will then continue over the next time period. On completion of this integration, if 256 8-bit images of each pixel have been collected, they are transferred on line 50B to enhancement device 46B, and the integrator 42B is cleared.

The next integrator buffer 42C starts with a clear status and integrates over the following time period. At the close of the time period for integrator 42C, the stored images for each pixel are transferred on line 50C to enhancement device 46C for addition to the information stored in enhancement device 46B. Again, if 256 8-bit images have not been accumulated, the information accumulated at integrator 42C is carried forward as represented by line 51C to the next integration period 42D.

In the enhancer 46, the next step after integration is to subtract the background noise. Subtraction of background noise, per se, is known in the prior art relating to emission microscopy. However, because the level of the signal is so low, the actual level of the noise can vary, and therefore, a single threshold cannot be selected. Another step typically taken in prior art images is filtering, or averaging the picture over space. That is, each pixel is summed with its neighbors and the resulting addition is used as an intensity figure. However, the result of this is a clear loss in sharpness in the edges of the transition region from light to dark, as well as a great burden in the number of additions which must be carried out.

The present invention takes a new approach and takes advantage of the fact that the vast majority of pixels of any picture are noise. The noise signals are operated on both for utilization of adaptive histogram matching on the noise signals and more specifically by effectively averaging each pixel intensity over its neighbors, this step being applied only to the noise signals. This will reduce the noise at the expense of its resolution; but the resolution of the noise being of no significance. Thereafter, eliminating pixels below a certain intensity eliminates the noise.

Considering this process in more detail, the first stop in the process is to estimate the extent of the noise by taking a histogram of the noise. Referring, for example, to FIG. 5, the easier case to separate is one where the signal image from defects and the like 70 is relatively bright relative to the noise level 72. A more difficult case is where the signal image shown in FIG. 5B at 74 is relatively faint relative to the noise signal image 76. In either case, as a first step in the process and operating on the assumption that the histogram of the noise follows a Gaussian distribution, the program takes as a guess (step 106) of the mean for curve fitting the most frequent intensity in the faint half of the picture. A histogram is fitted to this faint portion of the picture (in FIG. 5A this would be the noise signal 72, in FIG. 5B the noise signal 76).

Once the curve has been fitted, this provides an estimate of noise intensity. Referring to FIG. 5C, this fitted histogram curve 78 allows us to define a threshold level 80, beyond which the signal is presumed to be information rather than noise (step 108). This threshold can thus be extrapolated based on the curve fitting to the noise portion of the signal, without reference to the actual intensity of the desired signal 70, 74, and providing the starting point for eliminating the noise in the return without disturbing the signal return which contains the information to be analyzed and displayed.

It is important to reiterate that the first guess of the distribution to which the histogram is to be applied is the average of the signal in the faint portion of the picture. The histogram of the noise pixels in this portion of the picture is then fitted to the expected Gaussian distribution. The parameters of the fitted distribution allow an automatic on-line estimation of the noise magnitude (step 112), providing for optimum noise filtering operations to be applied.

More particularly, the histogram fitting process requires a good first guess of the parameters of the noise distribution based on the most frequent intensity in the faint half of the picture; refinement of the parameters in the distribution by an iterative Newton-Raphson technique as is well known in the art; and fitting of the histogram to this faint half of the distribution. (SIC) provides an optimum threshold 83 for filtering. That is, once the Gaussian distribution is fitted to preferably the faintest 25% of the pixels, a determination of the statistical parameters of the noise follows. These noise parameters provide the basis for selective low pass filtering, that is, averaging only those pixels that have an intensity within the expected noise histogram and an intensity below initial threshold 80. This step will be followed by thresholding based on the threshold 83, which is defined by the averaging process to be described below. These steps which effectively reduce the distribution of noise pixels (FIG. 6) from that enclosed by curve 78 to the distribution enclosed by curve 81.

It is well known that in defining the average intensity of each pixel by adding it to an array of adjacent pixels and then dividing by that number of pixels to get an average intensity, the normal method of finding the average intensity of a pixel in an array of moby n pixels requires mn additions. This invention makes use of a modified approach to this averaging method (step 110) in which only four additions are necessary, significantly reducing processing time. As shown in FIG. 7 starting with the m by n array, this new approach will allow us to develop average pixel values over an extremely large area without paying a major penalty in computer time. Specifically, as a first step, we form a sum of the m pixels in each row 82A through 82N of the n rows in the array. Therefore, to move across the picture from left to right, i.e. averaging pixel intensities along a single row, only a single addition of the next column kernel and subtraction of the last column kernel to the left is necessary. Thus, the kernel for each pixel is formed of the sum of n row kernels and to move the kernel in the columnar direction, the last row kernel need only be subtracted, and the next row kernel in the direction of movement be added to form the necessary kernel for defining the average intensity of the pixel under study. Thus, except for calculation of the first complete kernel, only a minimal amount of processing time for definition for row and column kernels is necessary, resulting in a great increase in efficiency and processing time.

It is important to note that this averaging technique is only performed on the pixels below a selected threshold defined above as based on the noise distribution, so that the intensity of the signal pixels is not disturbed, which would result in a diminution of signal sharpness.

When the averaging step is complete, the averaged signals lying below newly derived threshold 83 are filtered out (step 114), leaving only the desired signal return from the device under test. It must be emphasized that the critical step in this part of the process was the selection of the average signal level in the faint portion of the picture as representing average noise level intensity, and then fitting a curve to the existing distribution and averaging only these signals below a distribution threshold to define a new threshold.

What is claimed:

1. An emission microscope for displaying images of light emitted from a semiconductor device comprising
    means for supporting said semiconductor device, said device facing an optical means for outputting an image of said device,
    means for intensifying said device image,
    means for converting said intensified image to a video image signal,
    processing means comprising an integrating device and an enhancement device operating in parallel, said video image being first processed in said integrating device to form an integrated image which is periodically transferred to said enhancing device for greater image enhancement, said enhancement are performed while further integration of said video image signal continues, and
    display means for displaying said enhanced image so that said integration may be terminated when said display image is of sufficient clarity.

2. An emission microscope as in claim 1 wherein said integrating device includes storage means having a defined capacity associated with each of said image pixels, said image being accumulated in said storage means over several video images, said integrated image being periodically transferred to said enhancement device.

3. An emission microscope as in claim 1 wherein said enhancement device includes a storage device associated with each of said pixels, the image being transferred from said integrating device replacing any prior image in said enhancement device.

4. An emission microscope as in claim 2 wherein said enhancement device includes a storage device of substantially larger storage capacity than the capacity of the storage device associated with the integrating device, the image in said integrating device being periodically added to the prior image in said enhancement device followed by clearing of the image in said integrating device, thereby allowing much longer image integration than possible by integration in the integration device alone.

5. An emission microscope as in claim 1 including means for estimating noise by assuming the faintest pixels in said video image of an electrically stimulated semiconductor device to be noise and fitting a histogram of noise to intensities of faintest pixels of the image, and means for deleting from the displayed image those pixels which fall within the calculated noise distribution.

6. An emission microscope as in claim 5 including threshold filtering means cooperating with said curve fitting means for setting a threshold based on the distribution defined by said curve fitting means, said filtering means eliminating pixels below said threshold.

7. An emission microscope as in claim 6 wherein said means for fitting the noise distribution operate on the faintest 25% of the pixels.

8. An emission microscope as in claim 5 wherein said curve fitting means cooperate with intensity averaging means for adding and averaging the intensity of adjacent pixels within said noise distribution curve to thereby clearly separate said noise pixels from signal pixels representing said image.

9. An emission microscope for displaying images of light emitted from a semiconductor device comprising
   means for supporting said semiconductor device, said device facing an optical means for outputting an image of said device,
   means for intensifying said device image,
   means for converting said intensified image to a video image signal,
   processing means comprising means for integrating said video image signal;
   means for estimating noise for integrating said video image signal;
   means for estimating noise in said video image by assuming the faintest pixels in said video image of an electrically stimulated semiconductor device to be noise and fitting a histogram of noise to intensities of faintest pixels of the image,
   means for deleting from the displayed image those pixels which fall within the calculated noise distribution, and
   display means for displaying said enhanced image so that said integration may be terminated when said display image is of sufficient clarity.

10. An emission microscope as in claim 9 including threshold filtering means cooperating with said curve fitting means for setting a threshold based on the distribution defined by said curve fitting means, said filtering means eliminating pixels below said threshold.

11. An emission microscope as in claim 9 wherein said curve fitting means cooperate with intensity averaging means for adding and averaging the intensity of adjacent pixels within said noise distribution curve to thereby clearly separate said noise pixels from signal pixels representing said image.

12. An emission microscope for displaying images of light emitted from a semiconductor devices comprising
   means for supporting said semiconductor device, said device facing an optical means for outputting an image of said device,
   means for converting said image to a video image signal,
   processing means comprising an integrating device and an enhancement device operating in parallel, said video image being first processed in said integrating device to form an integrated image which is periodically transferred to said enhancing device for greater image enhancement, said enhancement are performed while further integration of said video image signal continues,
   means for estimating noise by assuming the faintest pixels in said video image of an electrically stimulated semiconductor device to be noise and fitting a histogram of noise to intensities of faintest pixels of the image, and means for deleting from the displayed image those pixels which fall within the calculated noise distribution, and
   display means for displaying said enhanced image so that said integration may be terminated when said display image is of sufficient clarity.

* * * * *